(12) United States Patent
Sera

(10) Patent No.: US 9,043,262 B2
(45) Date of Patent: May 26, 2015

(54) INFORMATION PROVIDING APPARATUS FOR VEHICLE, AND METHOD THEREFOR

(75) Inventor: Manabu Sera, Chigasaki (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 245 days.

(21) Appl. No.: 13/701,288

(22) PCT Filed: Apr. 14, 2011

(86) PCT No.: PCT/JP2011/059253
§ 371 (c)(1),
(2), (4) Date: Nov. 30, 2012

(87) PCT Pub. No.: WO2011/152130
PCT Pub. Date: Dec. 8, 2011

(65) Prior Publication Data
US 2013/0073507 A1 Mar. 21, 2013

(30) Foreign Application Priority Data
Jun. 3, 2010 (JP) .................................. 2010-127810

(51) Int. Cl.
G06F 15/18 (2006.01)
G06N 5/02 (2006.01)
(Continued)

(52) U.S. Cl.
CPC .............. *G06N 5/02* (2013.01); *B60L 11/1861* (2013.01); *B60L 2250/16* (2013.01);
(Continued)

(58) Field of Classification Search
None
See application file for complete search history.

(56) References Cited

U.S. PATENT DOCUMENTS 5,426,589 A * 6/1995 Kitagawa et al. .............. 700/274
5,487,002 A * 1/1996 Diller et al. ........................ 701/1
(Continued)

FOREIGN PATENT DOCUMENTS

EP 1 738 947 A2 1/2007
JP 2001-41073 A 2/2001
(Continued)

OTHER PUBLICATIONS

Machine translation of JP 2003-219503, 17 pages.
(Continued)

*Primary Examiner* — Jeffrey A Gaffin
*Assistant Examiner* — Benjamin Buss
(74) *Attorney, Agent, or Firm* — Foley & Lardner LLP

(57) ABSTRACT

An information providing apparatus for vehicle has a remaining capacity detecting section 110 that detects a remaining capacity of a battery; a power consumption amount detecting section 130 that detects a power consumption amount of the battery; a power consumption amount history generating section 130 that generates a power consumption amount history on the basis of the power consumption amount detected by the power consumption amount detecting section 130; a charge necessity judgment information generating section 130 that generates, on the basis of the power consumption amount history generated by the power consumption amount history generating section 130, charge necessity judgment information which is information for user's judgment about whether or not charging of the battery is necessary; and a providing section 150 that provides information of the remaining capacity of the battery and the charge necessity judgment information with these information correlated with each other to the user. The information providing apparatus can properly provide the information for user's judgment about whether or not charging of the battery to the user.

8 Claims, 13 Drawing Sheets

(51) Int. Cl.
  *B60L 11/18* (2006.01)
  *B60L 3/12* (2006.01)
(52) U.S. Cl.
  CPC ......... *B60L 2260/54* (2013.01); *Y02T 10/7005* (2013.01); *Y02T 10/7044* (2013.01); *Y02T 10/705* (2013.01); *B60L 3/12* (2013.01); *B60L 2240/80* (2013.01); *B60L 2260/52* (2013.01); *B60L 2260/58* (2013.01)

(56) References Cited

U.S. PATENT DOCUMENTS

| | | | |
|---|---|---|---|
| 5,521,443 | A | 5/1996 | Imura et al. |
| 5,869,951 | A * | 2/1999 | Takahashi ..................... 320/104 |
| 5,952,813 | A * | 9/1999 | Ochiai .......................... 320/104 |
| 7,360,615 | B2 * | 4/2008 | Salman et al. ........... 180/65.265 |
| 7,489,106 | B1 * | 2/2009 | Tikhonov ...................... 320/116 |
| 2005/0151513 | A1 * | 7/2005 | Cook et al. .................... 320/137 |
| 2005/0274553 | A1 * | 12/2005 | Salman et al. ............... 180/65.2 |
| 2009/0030568 | A1 * | 1/2009 | Amano et al. .................. 701/22 |
| 2009/0224869 | A1 * | 9/2009 | Baker et al. ..................... 340/5.1 |
| 2010/0000809 | A1 * | 1/2010 | Nishi et al. ................. 180/65.29 |
| 2010/0138098 | A1 * | 6/2010 | Takahara et al. ................ 701/29 |
| 2010/0168945 | A1 * | 7/2010 | Ohno .............................. 701/22 |
| 2010/0188043 | A1 * | 7/2010 | Kelty et al. .................... 320/109 |
| 2010/0312430 | A1 * | 12/2010 | Troncoso et al. ............... 701/29 |
| 2011/0046844 | A1 * | 2/2011 | Honner et al. .................. 701/33 |
| 2011/0087390 | A1 * | 4/2011 | Pandit et al. .................... 701/22 |
| 2013/0033230 | A1 * | 2/2013 | Falk et al. ...................... 320/109 |
| 2013/0093393 | A1 * | 4/2013 | Shimotani et al. ............. 320/109 |

FOREIGN PATENT DOCUMENTS

| | | |
|---|---|---|
| JP | 2001-258177 A | 9/2001 |
| JP | 2002-135906 A | 5/2002 |
| JP | 3400034 B2 | 2/2003 |
| JP | 2003-219503 A | 7/2003 |
| JP | 2007-8349 A | 1/2007 |
| JP | 2007-312581 A | 11/2007 |
| JP | 2009-30598 A | 2/2009 |
| JP | 2010-026951 A | 2/2010 |

OTHER PUBLICATIONS

Machine translation of JP 2001-258177, 57 pages.
Machine translation of JP 2010-26951, 29 pages.
Japanese Office Action, Dec. 17, 2013, 4 pages.
Japanese Office Action, Mar. 2014, 3 pages.
Japanese Office Action, Nov. 25, 2014, 5 pages.

* cited by examiner

FIG.4

| | TIME | 0:00 | .. | 7:50 | 8:00 | 8:10 | 8:20 | 8:30 | 8:40 | 8:50 | 9:00 | 9:10 | 9:20 | 9:30 | .. | 22:50 | 23:00 | 23:10 | .. | 23:50 | 24:00 |
|---|---|---|---|---|---|---|---|---|---|---|---|---|---|---|---|---|---|---|---|---|---|
| SPRING (Mar. to May) | WEEKDAY | | | | | | | | | | | | | | | | | | | | |
| | FINE WEATHER · CLOUDY WEATHER | | | | | | | | | | | | | | | | | | | | |
| | n(0) | 0 | .. | 0 | 0 | 20 | 18 | 16 | 16 | 16 | 14 | 14 | 12 | 0 | .. | 0 | 0 | 0 | .. | 0 | 0 |
| | n(1) | 0 | .. | 0 | 0 | 19 | 17 | 16 | 16 | 16 | 15 | 14 | 13 | 0 | .. | 0 | 0 | 0 | .. | 0 | 0 |
| | .. | .. | .. | .. | .. | .. | .. | .. | .. | .. | .. | .. | .. | .. | .. | .. | .. | .. | .. | .. | .. |
| | RAINY WEATHER | | | | | | | | | | | | | | | | | | | | |
| | HOLIDAY | | | | | | | | | | | | | | | | | | | | |
| | SPECIFIC DAY | | | | | | | | | | | | | | | | | | | | |
| SUMMER (Jun. to Aug.) | | | | | | | | | | | | | | | | | | | | | |
| AUTUMN (Sep. to Nov.) | | | | | | | | | | | | | | | | | | | | | |
| WINTER (Dec. to Feb.) | | | | | | | | | | | | | | | | | | | | | |

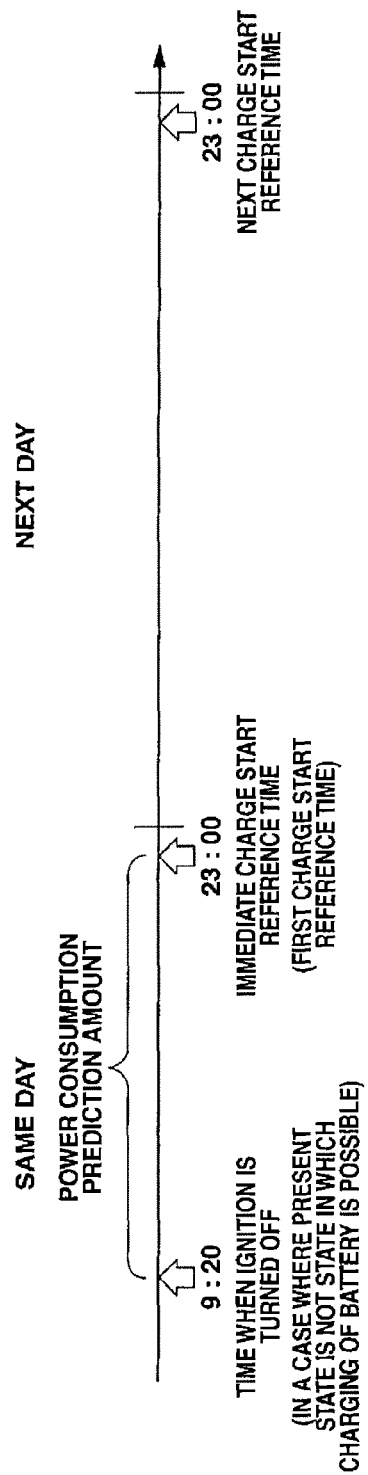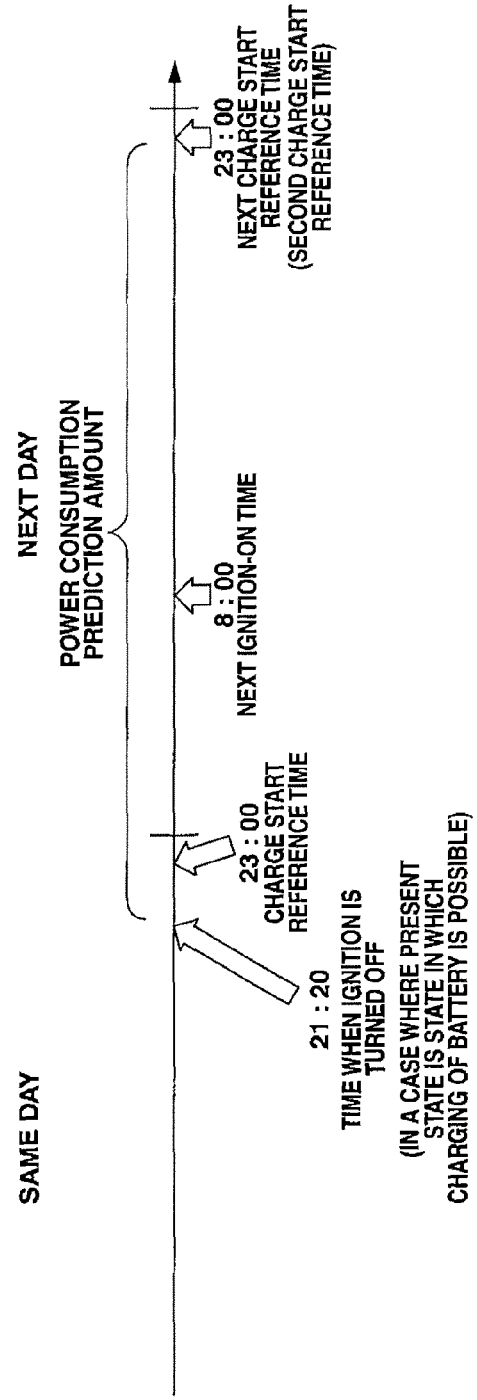

INFORMATION PROVIDING APPARATUS FOR VEHICLE, AND METHOD THEREFOR

TECHNICAL FIELD

The present invention relates to an information providing apparatus for a vehicle and an information providing method for the vehicle.

BACKGROUND ART

As the information providing apparatus mounted in an electric vehicle and a hybrid vehicle, an information providing apparatus that provides a battery remaining capacity (remaining amount) to a user has been known (Patent Document 1).

In the case of the electric vehicle and the hybrid vehicle, a range by a fully charged battery is generally short as compared with a range of an engine vehicle, and it takes time to charge the battery as compared with a refueling time of the engine vehicle. Thus, judgment on necessity of charging the battery (judgment about whether or not the battery charging is necessary) is important for the electric vehicle and the hybrid vehicle. However, in the related art information providing apparatus, the information providing apparatus merely provides or displays only the battery remaining capacity, as information to judge the necessity of charging the battery, to the user. Therefore, it might be difficult for the user to judge whether the battery charging is necessary or not.

CITATION LIST

Patent Document

Patent Document 1: Japanese Patent No. 3400034

SUMMARY OF THE INVENTION

An object of the present invention is to provide an information providing apparatus which is capable of properly providing the information to judge the necessity of charging the battery to the user.

In the present invention, the information providing apparatus generates charge necessity judgment information which is information for user's judgment about whether or not charging of the battery is necessary, on the basis of power consumption amount history that is generated on the basis of a power consumption amount of a battery, and provides information of a remaining capacity of the battery and the charge necessity judgment information with these information correlated with each other to the user.

According to the present invention, since the information of the remaining capacity of the battery and the charge necessity judgment information which is the information for user's judgment about whether or not charging of the battery is necessary can be provided to the user with these information correlated with each other, the user can properly judge whether or not the charging of the battery is necessary.

BRIEF DESCRIPTION OF DRAWINGS

FIG. 4 is a drawing showing an example of a history of the power consumption amount.
FIGS. 10A and 10B are drawings for explaining a charge start reference time.

DESCRIPTION OF EMBODIMENTS

In the following description, embodiments of the present invention will be explained with reference to the drawings.

First Embodiment

Figure 1:
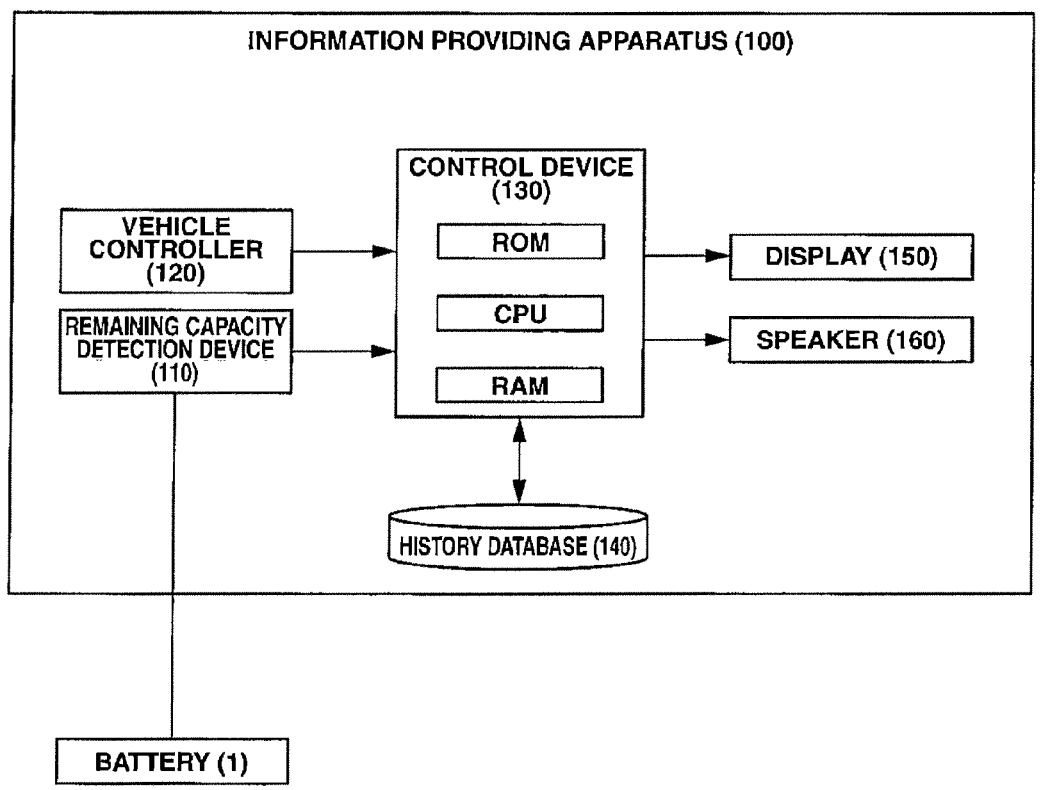
FIG. 1 is a block diagram of an information providing apparatus of a first embodiment.

FIG. 1 is a block diagram of an information providing apparatus of a first embodiment. An information providing apparatus 100 of the present embodiment is, for example, a navigation system mounted in a vehicle, meter, etc. As shown in FIG. 1, the information providing apparatus 100 has a remaining amount (remaining capacity) detection device 110, a vehicle controller 120, a control device 130, a history database 140, a display 150 and a speaker 160.

The remaining amount detection device 110 is connected to a battery 1, and detects a remaining capacity (remaining amount) of the battery 1. The remaining capacity of the battery 1 detected by the remaining amount detection device 110 is sent to the control device 130. Here, a manner of detecting the remaining capacity of the battery 1 by the remaining amount detection device 110 is not especially limited. For instance, summation of a charge/discharge current value of the battery 1 is calculated, and on the basis of this summation value of the charge/discharge current value and a terminal voltage of the battery 1, the remaining capacity of the battery 1 can be calculated.

The vehicle controller 120 is connected to each vehicle-mounted device, and obtains each vehicle information including ignition. The vehicle information obtained by the vehicle controller 120 is sent to the control device 130.

The control device 130 has a ROM (ReadOnlyMemory) storing a program to provide the user with information of the remaining capacity of the battery 1 and information of a prediction amount of power consumption which is information for user's judgment on necessity of charging the battery 1 (user's judgment about whether or not charging of the battery 1 is necessary), a CPU (Central Processing Unit), as an operation circuit, executing the program stored in this ROM and a RAM (Random Access Memory) functioning as an accessible storage device. Here, as the operation circuit, an MPU (Micro Processing Unit), a DSP (Digital Signal Processor), an ASIC (Application Specific Integrated Circuit), an FPGA (Field Programmable Gate Array), etc. could be used instead of the CPU or together with the CPU.

The control device 130 executes the program stored in the ROM by the CPU, thereby performing an obtaining function that obtains the vehicle information, a calculating function that calculates an amount of the power consumption per a predetermined time, a power consumption amount history generating function that generates a history of the power consumption amount, a charge status detecting function that detects a charge status of the battery 1, a charge history generating function that generates a charge history, an estimating function that estimates a time when the charging starts by the user as a charge start reference time, a charge necessity judgment information generating function that generates information of the power consumption prediction amount, and a predicting function that predicts a time of next ignition-on. In the following description, each function which the control device 130 has will be explained.

The obtaining function of the control device 130 obtains each vehicle information including ignition from the vehicle controller 120.

The calculating function of the control device 130 calculates the power consumption amount of the battery 1 per the predetermined time. Although a calculating manner of the power consumption amount by the calculating function is not especially limited, for instance, the power consumption amount per the predetermined time could be calculated on the basis of the summation value of the charge/discharge current value of the battery 1 and the terminal voltage of the battery 1. As the power consumption amount calculated by the calculating function, it is a vehicle-travelling power consumption amount which is an amount of power consumed by each vehicle-mounted device when the vehicle travels, also it is a vehicle-not-travelling power consumption amount which is an amount of power consumed by the fact that, for example, the battery 1 is used as a storage battery and the power is supplied to home electrical appliances when the vehicle does not travel.

Figure 2:
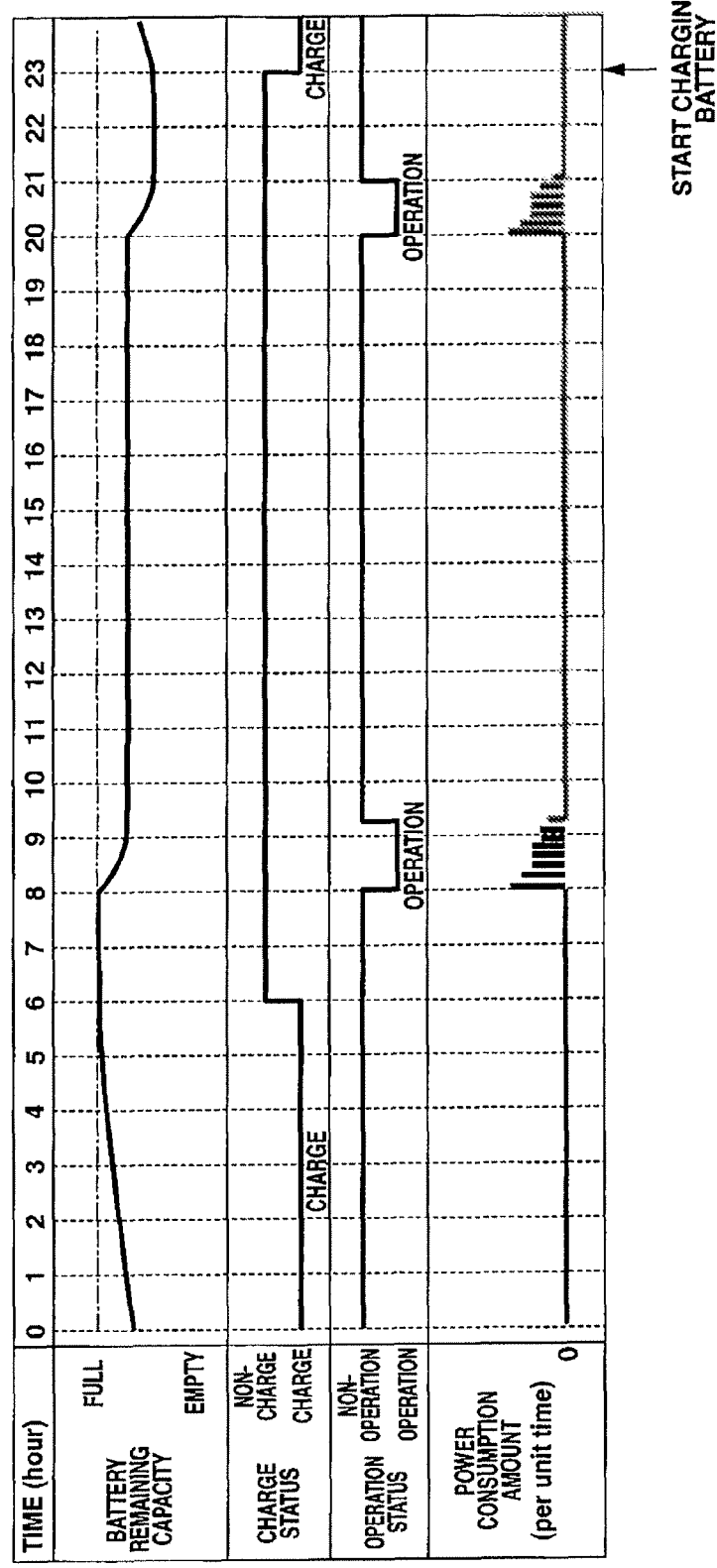
FIG. 2 is a graph showing an example of an amount of power consumption calculated per day.

Here, FIG. 2 is a graph showing an example of the power consumption amount calculated per day. In the following description, a calculating operation of the power consumption amount per day will be explained. In FIG. 2, the graph shows the remaining capacity of the battery 1, the charge status of the battery 1 which indicates whether or not the battery 1 is charged, an operation status of the battery 1 which indicates whether or not the battery 1 supplies the power, and the power consumption amount (kWh) per a predetermined time (in the example shown in FIG. 2, every 10 minutes), for each time from 0:00 to 24:00. In the example shown in FIG. 2, the user charges the battery 1 at user's home from 23:00 to 6:00 using midnight power.

First, regarding a time period from 0:00 to 6:00, the graph shows a state in which the battery 1 is charged by an external power supply using the midnight power by the user so that the charging of the battery 1 is completed at 6:00 (the charge status of the battery 1 is "charge", and the operation status of the battery 1 is "non-operation"). As shown in FIG. 2, since the charging of the battery 1 using the midnight power is carried out by the user for the time period from 0:00 to 6:00, the remaining capacity of the battery 1 increases, and the battery 1 does not operate. Thus, the calculating function calculates the power consumption amount every 10 minutes as 0 (zero).

Regarding a time period from 6:00 to 8:00, the graph shows a state in which the battery 1 is not charged after the charging of the battery 1 is completed at 6:00 and also the battery 1 does not operate (the charge status of the battery 1 is "non-charge", and the operation status of the battery 1 is "non-operation"). As shown in FIG. 2, since the charging of the battery 1 is not carried out and the battery 1 does not operate for the time period from 6:00 to 8:00, the remaining capacity of the battery 1 does not change. The battery 1 does not operate for the time period from 6:00 to 8:00 in this way, thus the calculating function calculates the power consumption amount every 10 minutes as 0 (zero).

Next, regarding a time period from 8:00 to 9:20, the graph shows a state in which the vehicle travels by the user, for example, to commute to an office (the charge status of the battery 1 is "non-charge", and the operation status of the battery 1 is "operation"). As shown in FIG. 2, because of the vehicle travel, the remaining capacity of the battery 1 decreases for the time period from 8:00 to 9:20. Since the battery 1 operates by the vehicle travel in this way, the calculating function calculates the power consumption amount according to the operation of the battery 1.

Subsequently, regarding a time period from 9:20 to 20:00, as same as the time period from 6:00 to 8:00, the graph shows a state in which the battery 1 is not charged and also the battery 1 does not operate (the charge status of the battery 1 is "non-charge", and the operation status of the battery 1 is "non-operation"). As shown in FIG. 2, since the charging of the battery 1 is not carried out and the battery 1 does not operate for the time period from 9:20 to 20:00 in this way, the remaining capacity of the battery 1 does not change. The battery 1 does not operate for the time period from 9:20 to 20:00 in this way, thus the calculating function calculates the power consumption amount every 10 minutes as 0 (zero).

Regarding a time period from 20:00 to 21:10, the graph shows a state in which the vehicle travels by the user, for example, to return home from the office (the charge status of the battery 1 is "non-charge", and the operation status of the battery 1 is "operation"). As shown in FIG. 2, as same as the time period from 8:00 to 9:20, because of the vehicle travel, the remaining capacity of the battery 1 decreases for the time period from 20:00 to 21:10. Since the battery 1 operates by the vehicle travel in this way, the calculating function calculates the power consumption amount according to the operation of the battery 1.

Further, regarding a time period from 21:10 to 23:00, as same as the time period from 6:00 to 8:00 and the time period from 9:20 to 20:00, the graph shows a state in which the battery 1 is not charged and also the battery 1 does not operate (the charge status of the battery 1 is "non-charge", and the operation status of the battery 1 is "non-operation"). As shown in FIG. 2, as same as the time period from 6:00 to 8:00 and the time period from 9:20 to 20:00, the remaining capacity of the battery 1 does not change for the time period from 21:10 to 23:00. The battery 1 does not operate for the time period from 21:10 to 23:00 in this way, thus the calculating function calculates the power consumption amount every 10 minutes as 0 (zero).

Regarding a subsequent time period from 23:00 to 24:00, the graph shows a state in which the charging starts by the user at 23:00 and, as same as the time period from 0:00 to 6:00, the battery 1 is charged using the midnight power (the charge status of the battery 1 is "charge", and the operation status of the battery 1 is "non-operation"). As shown in FIG. 2, as same as the time period from 0:00 to 6:00, the remaining capacity of the battery 1 increases by the charging of the battery 1 using the midnight power for the time period from 23:00 to 24:00, and the battery 1 does not operate. Thus, the calculating function calculates the power consumption amount every 10 minutes as 0 (zero).

As described above, in the example shown in FIG. 2, for the time period from 8:00 to 9:20 and the time period from 20:00 to 21:10 for which the battery 1 operates by the vehicle travel, the power consumption amount according to the operation of the battery 1 is calculated. The power consumption amount calculated in this way is recorded by a time series (is correlated with a time series) by the after-mentioned power consumption amount history generating function, and is stored in the history database 140 as the power consumption amount history.

Figure 3:
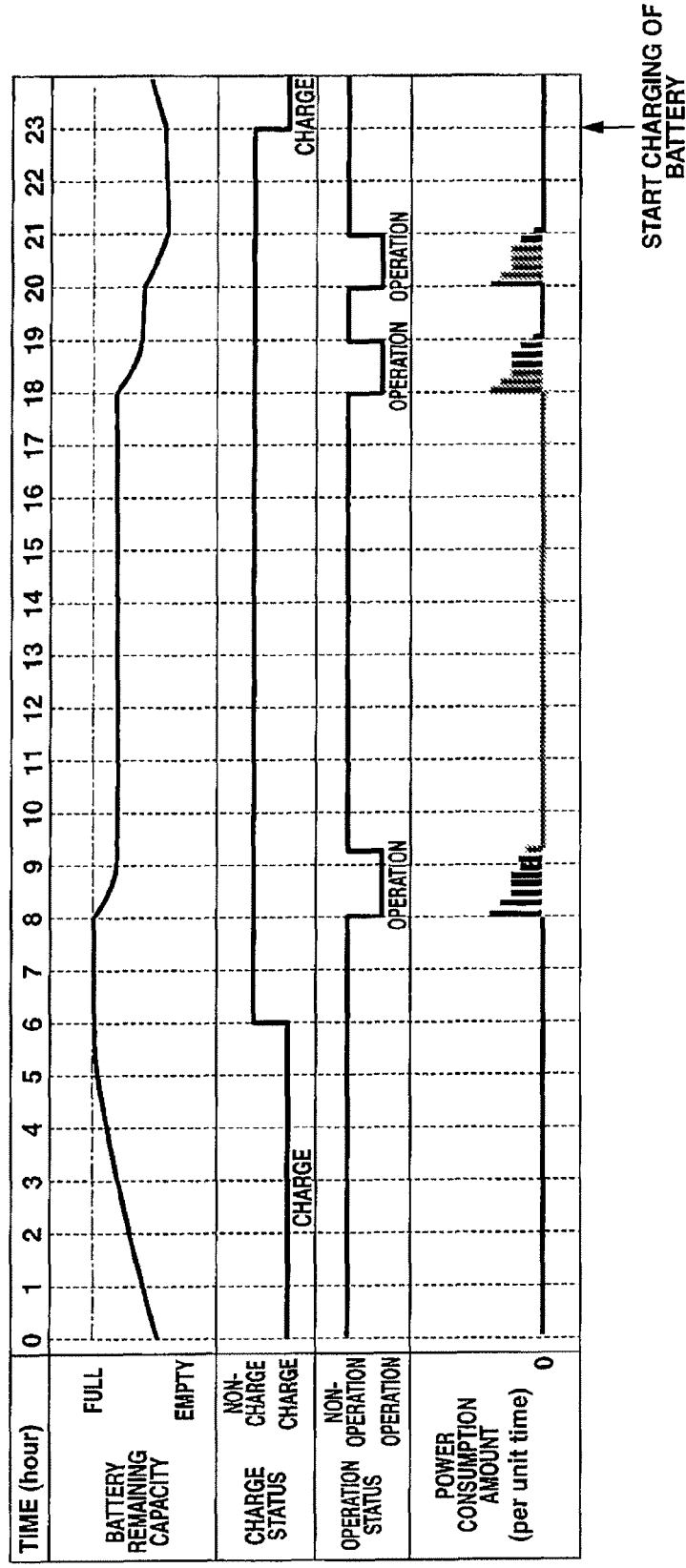
FIG. 3 is a graph showing another example of the amount of power consumption calculated per day.

Here, FIG. 3 is a graph showing another example of the power consumption amount calculated per day. FIG. 3 shows the power consumption amount of a different day from FIG. 2. In the following description, a calculating manner of the power consumption amount in the example shown in FIG. 3 will be explained.

In the example shown in FIG. 3, regarding a time period from 0:00 to 18:00, the power consumption amount is calculated as same as the example shown in FIG. 2. That is, for the time period from 8:00 to 9:20, the vehicle travels by the user, for example, to commute to the office, and the power consumption amount according to the operation of the battery 1 is calculated. Further, for the time period from 0:00 to 8:00 and a time period from 9:20 to 18:00, the power consumption amount is calculated as 0 (zero).

However, in the example shown in FIG. 3, regarding a time period from 18:00 to 19:10, unlike the example shown in FIG. 2, the power of the battery 1 is consumed by the vehicle travel etc. Thus, as shown in FIG. 3, the remaining capacity of the battery 1 decreases for the time period from 18:00 to 19:10, and the calculating function calculates the power consumption amount according to the operation of the battery 1.

Further, in the example shown in FIG. 3, regarding a time period from 19:10 to 24:00, as same as the example shown in FIG. 2, the power consumption amount is calculated. That is, for the time period from 20:00 to 21:10, the power consumption amount according to the operation of the battery 1, for instance, by the vehicle travel is calculated. Further, for a time period from 19:10 to 20:00 and a time period from 21:10 to 24:00, the power consumption amount is calculated as 0 (zero).

The calculation of the power consumption amount by the calculating function is performed in this way.

Next, the power consumption amount history generating function of the control device 130 will be explained. The power consumption amount history generating function generates the power consumption amount history by storing the power consumption amount per the predetermined time calculated by the calculating function in the history database 140 with the power consumption amount correlated with the time when the power consumption amount is calculated. Further, in the present embodiment, as shown in FIG. 4, the power consumption amount history generating function classifies the power consumption amount history according to an attribute of the day when the power consumption amount is calculated, season and weather of the day by correlating the power consumption amount with information of the attribute of the day, season and weather, before generating the power consumption amount history. FIG. 4 is a drawing showing an example of the power consumption amount history stored in the history database 140.

Here, the attribute of the day is, for example, date and day (Sun. to Sat.) when the power consumption amount is calculated and information about whether the day when the power consumption amount is calculated is weekday, holiday or specific day. In the example shown in FIG. 4, the power consumption amount history is classified according to whether the day when the power consumption amount is calculated is the weekday, the holiday or the specific day. Further, the weather is, for example, information about whether the weather of the time when the power consumption amount is calculated is fine weather, cloudy weather or rainy weather. In the example shown in FIG. 4, the power consumption amount history is classified according to whether the weather of the time when the power consumption amount is calculated is the fine weather•the cloudy weather or the rainy weather. Furthermore, the season is information about whether the season of the day when the power consumption amount is calculated is spring, summer, autumn or winter. In the example shown in FIG. 4, the power consumption amount history is classified according to whether the whether the season of the day when the power consumption amount is calculated is the spring (March to May), the summer (June to August), the autumn (September to November) or the winter (December to February).

Here, since the attribute of the day has an influence on, for instance, presence or absence of traffic jam, a frequency of operation of the battery 1 and a continuous operation time of the battery 1, the attribute of the day is a factor in influencing the power consumption amount. Further, since the weather has an influence on, for instance, operation of a wiper and a defroster, likewise the weather is a factor in influencing the power consumption amount. Furthermore, since the season has an influence on, for instance, an air conditioner, an air resistance and a resistance of oil of a gear and a bearing etc., likewise the season is a factor in influencing the power consumption amount. For this reason, in the present embodiment, the power consumption amount history is classified according to the attribute of the day, the weather and the season so as to be able to improve an after-mentioned prediction accuracy of a prediction amount of the power consumption using a proper power consumption amount history according to the attribute of the day, the weather and the season. The classification of the power consumption amount history generated by the power consumption amount history generating function is not limited to the classification according to the attribute of the day, the weather and the season, the power consumption amount history could be classified using other classification items.

In FIG. 4, information of the power consumption amount calculated in the example in FIG. 2 is shown by n(0), and information of the power consumption amount calculated in the example in FIG. 3 is shown by n(1). That is, as shown in FIG. 4, the information n(0) of the power consumption amount calculated in the example in FIG. 2 is classified as "the season is the spring (March to May), the attribute of the day is the weekday, and the weather is the fine weather•the cloudy weather". Here, since the power consumption amount calculated in the example in FIG. 2 and the power consumption amount calculated in the example in FIG. 3 are the power consumption amounts which are calculated on the different days, the information n(0) of the power consumption amount calculated in the example in FIG. 2 and the information n(1) of the power consumption amount calculated in the example in FIG. 3 are different from each other. For example, with regard to the power consumption amount for a time period from 8:00 to 8:10, it is 20 (kWh) in the information n(0) of the power consumption amount calculated in the example in FIG. 2, while it is 19 (kWh) in the information n(1) of the power consumption amount calculated in the example in FIG. 3.

The charge status detecting function of the control device 130 detects the charge status of the battery 1. In the present embodiment, the charge status detecting function obtains, as the charge status, the remaining capacity of the battery 1 per the predetermined time detected by the remaining amount detection device 110.

The charge history generating function of the control device 130 generates the charge history on the basis of the charge status detected by the charge status detecting function. In the present embodiment, for instance, as shown in FIG. 2 and FIG. 3, the charge history generating function generates a history of the remaining capacity of the battery 1 as the charge history by storing the remaining capacity of the battery 1 per the predetermined time obtained by the charge status detecting function in the history database 140 with the remaining capacity of the battery 1 obtained correlated with the time series.

The estimating function of the control device 130 estimates the time when the charging of the battery 1 starts by the user as the charge start reference time on the basis of the charge history generated by the charge history generating function. Here, although an estimating manner of the charge start reference time by the estimating function is not especially limited, in the present embodiment, the charge start reference time is estimated in a following manner.

That is, in the present embodiment, the history of the remaining capacity of the battery 1 per the predetermined time stored along the time series is obtained as the charge history. Then, on the basis of this charge history, the estimating function determines, as a basic charge time period, a time period having a high frequency of such charging that a predetermined amount of the power or more is charged and also the battery is charged to a full charge. For instance, as shown in FIG. 2 and FIG. 3, in a case where a frequency of such charging that a charging of a predetermined charge amount or more is performed after the charging starts at 23:00 and the battery 1 is in a fully charged state at 6:00 on the following day is high, a time period from 23:00 to 6:00 is determined as the basic charge time period. Then, a start time of the determined basic charge time period is estimated as the charge start reference time by the estimating function. For example, in the examples shown in FIG. 2 and FIG. 3, in the case where the time period from 23:00 to 6:00 is estimated as the basic charge time period, "23:00" which is the start time of this basic charge time period is estimated as the charge start reference time.

Or, as the other manner of estimating the charge start reference time, for instance, by detecting a connection state with the external power supply, as the charge status, the time when the charging of the battery starts by the user is detected, and the charge history is generated on the basis of the time when the charging of the battery starts by the user. Then, on the basis of this charge history formed by the time when the battery charge starts by the user, a time at which a frequency of the battery charge start by the user is high could be estimated as the charge start reference time. The above mentioned estimating manners of the charge start reference time are examples, and they are not limited to these manners.

The charge necessity judgment information generating function of the control device 130 generates, on the basis of the power consumption amount history generated by the power consumption amount history generating function, the information of the power consumption prediction amount which is the information for the user's judgment on necessity of the charging the battery 1 (the user's judgment about whether or not the charging of the battery 1 is necessary). More specifically, in order for the user to judge whether or not the charging of the battery 1 is necessary, the charge necessity judgment information generating function predicts, as the power consumption prediction amount, a power consumption amount which is an amount of the power consumed from a time when the ignition is turned off to the charge start reference time estimated by the estimating function, and generates the information of the predicted power consumption prediction amount.

Further, when predicting the power consumption prediction amount, the charge necessity judgment information generating function predicts, as a vehicle-travelling power consumption prediction amount, a power consumption amount which is an amount of the power consumed when the vehicle travels, also predicts, as a vehicle-not-travelling power consumption prediction amount, a power consumption amount which is an amount of the power consumed when the vehicle does not travel. Then, the charge necessity judgment information generating function generates information of the vehicle-travelling power consumption prediction amount which is an amount of the power consumed by the fact that the power is supplied to each vehicle-mounted device, also generates information of the vehicle-not-travelling power consumption prediction amount which is an amount of the power consumed by the fact that, for example, the battery 1 is used as the storage battery and the power is supplied to the home electrical appliances outside the vehicle. A generating manner of the information of the power consumption prediction amount by the charge necessity judgment information generating function will be explained in detail later.

The predicting function of the control device 130 predicts, as a next ignition-on time, the time when next the ignition is turned on after the ignition is turned off. The predicted next ignition-on time is used when generating the information of the power consumption prediction amount. A predicting manner of the next ignition-on time by the predicting function will be explained later.

The display 150 is, for instance, a display of the navigation system. The display 150 displays, on a screen provided in the display 150, the information of the remaining capacity of the battery 1 detected by the remaining amount detection device 110 and the information of the power consumption prediction amount generated by the control device 130, with the information of the remaining capacity of the battery 1 and the information of the power consumption prediction amount correlated with each other, thereby providing or showing these information to the user.

Figure 5:
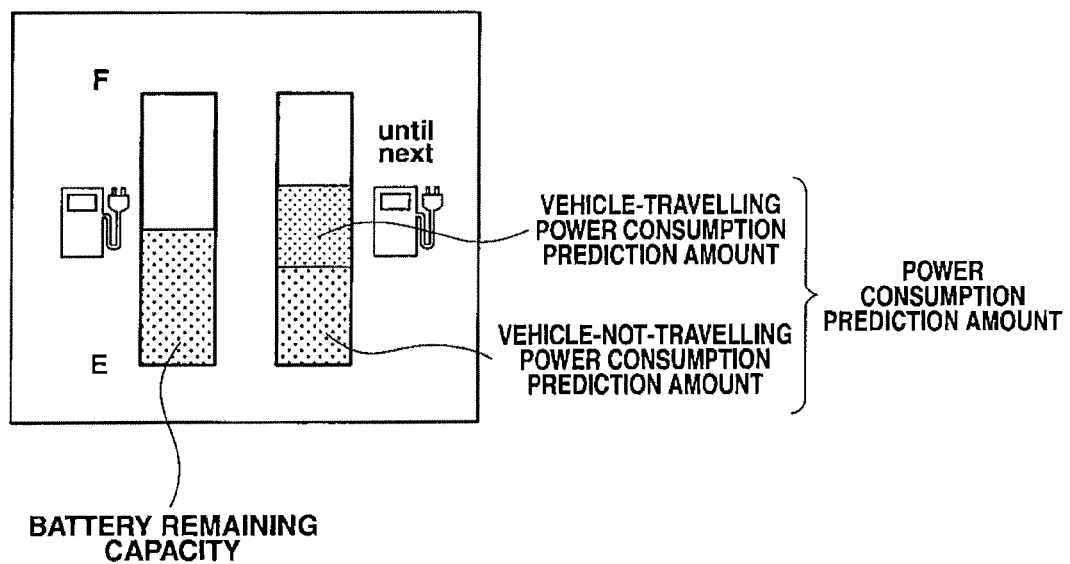
FIG. 5 is a drawing showing an example of information of a battery remaining capacity (remaining amount) and information of a prediction amount of the power consumption, displayed on a display.
Figure 6:
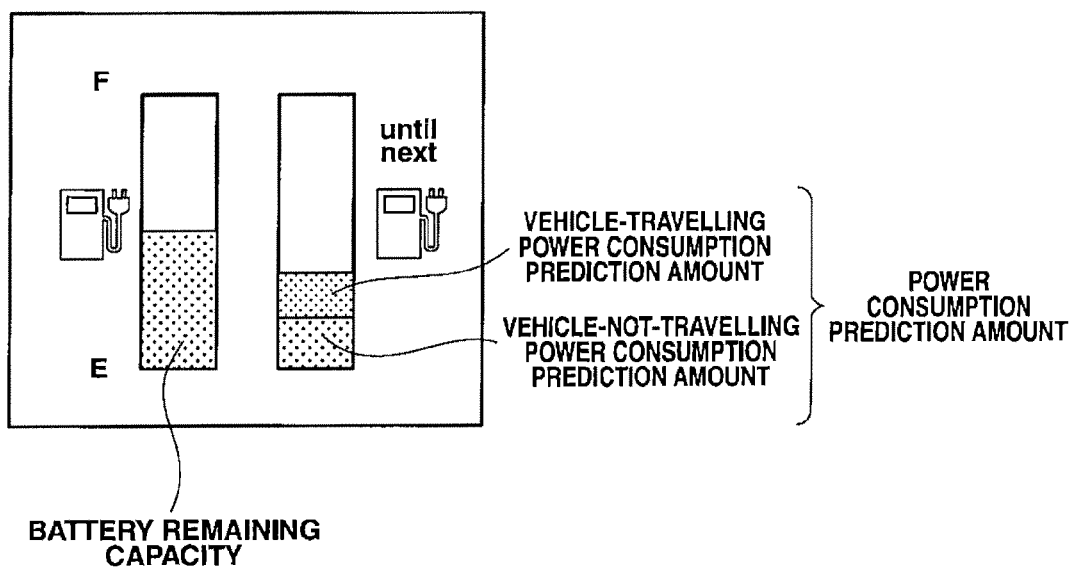
FIG. 6 is a drawing showing another example of the information of the battery remaining capacity (remaining amount) and the information of the prediction amount of the power consumption, displayed on the display.

FIG. 5 and FIG. 6 are drawings showing examples of the information of the remaining capacity of the battery 1 and the information of the power consumption prediction amount, displayed on the display 150. In the present embodiment, as shown in FIG. 5 and FIG. 6, the information of the remaining capacity of the battery 1 and the information of the power consumption prediction amount are displayed with these information arranged side by side on the display 150. Further, as described above, the information of the power consumption prediction amount includes the information of the vehicle-travelling power consumption prediction amount and the information of the vehicle-not-travelling power consumption prediction amount. In the present embodiment, as shown in FIG. 5 and FIG. 6, the display 150 provides or shows the information of the vehicle-travelling power consumption prediction amount and the information of the vehicle-not-travelling power consumption prediction amount to the user so that the user can recognize these information. In the example shown in FIG. 5, since the remaining capacity of the battery 1 is displayed with its amount (the remaining capacity) being less (smaller) than the power consumption prediction amount, the user can judge that the charging of the battery 1 is necessary. On the other hand, in the example shown in FIG. 6, since the remaining capacity of the battery 1 is displayed with its amount (the remaining capacity) being greater than the power consumption prediction amount, the user can judge that there is no need to hurry to charge the battery 1 then the user can voluntarily charge the battery 1. Here, as the display 150, it is not limited to the display of the navigation system, the meter (a battery capacity meter) mounted on the vehicle or a display of a cellular phone could be used.

The speaker 160 outputs, for instance, alarm or sound such as informing tone or vocal sound such as voice guidance in synchronization with or in accordance with the presentation or the display (i.e. the providing or the showing) of the information by the display 150, in order to inform the user of the display of the information of the remaining capacity of the battery 1 and the information of the power consumption prediction amount.

Figure 7:
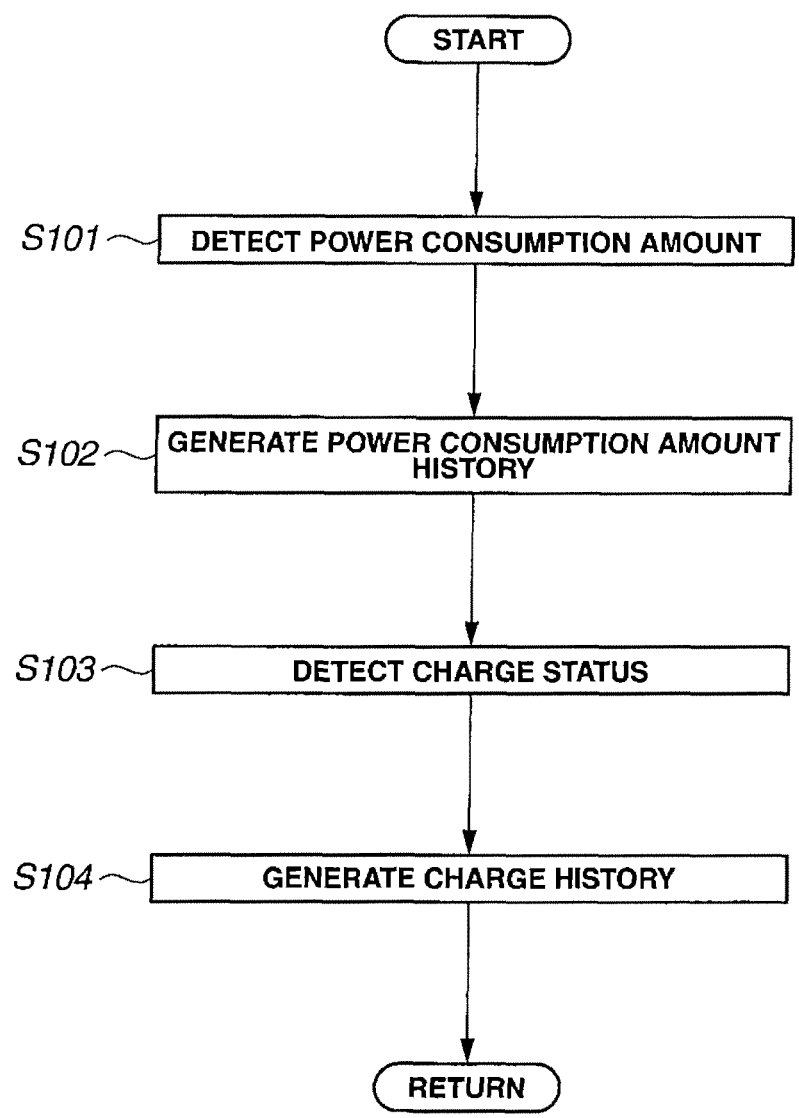
FIG. 7 is a flow chart showing a generating process of the power consumption amount history and a charge history of the present embodiment.

Next, a generating process of the power consumption amount history and the charge history of the present embodiment will be explained with reference to FIG. 7. FIG. 7 is a flow chart showing the generating process of the power consumption amount history and the charge history of the present embodiment. Here, this process is periodically repeated at a predetermined time interval, for example, every 10 minutes.

First, at step S101, the power consumption amount of the battery 1 is calculated by the calculating function of the control device 130. Then, at step S102, on the basis of the power consumption amount calculated at step S101, the power consumption amount history is generated by the power consumption amount history generating function of the control device 130. More specifically, the generation of the power consumption amount is performed by storing the power consumption amount calculated at step S101 in the history database 140 with the power consumption amount correlated with the time when the power consumption amount is calculated, the attribute of the day when the power consumption amount is calculated, the season and the weather. Here, the control device 130 can obtain the information about the attribute of the day when the power consumption amount is calculated and the season, for instance, from a calendar function which is provided in the control device 130. In addition, the control device 130 can obtain the information about the weather of the time when the power consumption amount is calculated, for instance, by communication with an external server that manages the weather information, or can judge the weather, for instance, from operation states of the wiper, the air conditioner and a headlight.

Subsequently, at step S103, the charge status of the battery 1 is detected by the charge status detecting function of the control device 130. In the present embodiment, as the charge status of the battery 1, as shown in FIG. 2 and FIG. 3, the remaining capacity of the battery 1 per the predetermined time is detected. Then, at step S104, on the basis of the charge status detected at step S103, the charge history is generated by the charge history generating function of the control device 130. In the present embodiment, at step S103, as the charge status of the battery 1, the remaining capacity of the battery 1 per the predetermined time is detected. Then, at step S104, by storing the remaining capacity of the battery 1 per the predetermined time in the history database 140 with the remaining capacity of the battery 1 per the predetermined time correlated with the time series, the charge history is generated. After the step S104 is ended, the routine returns to step S101, and the generating process of the power consumption amount history and the charge history is repeated.

The generating process of the power consumption amount history and the charge history of the present embodiment is performed in this way. The power consumption amount history and the charge history generated as explained above are used, in an after-mentioned information providing process, to generate the information of the power consumption prediction amount for the user's judgment on necessity of charging the battery 1 (the user's judgment about whether or not charging of the battery 1 is necessary).

Figure 8:
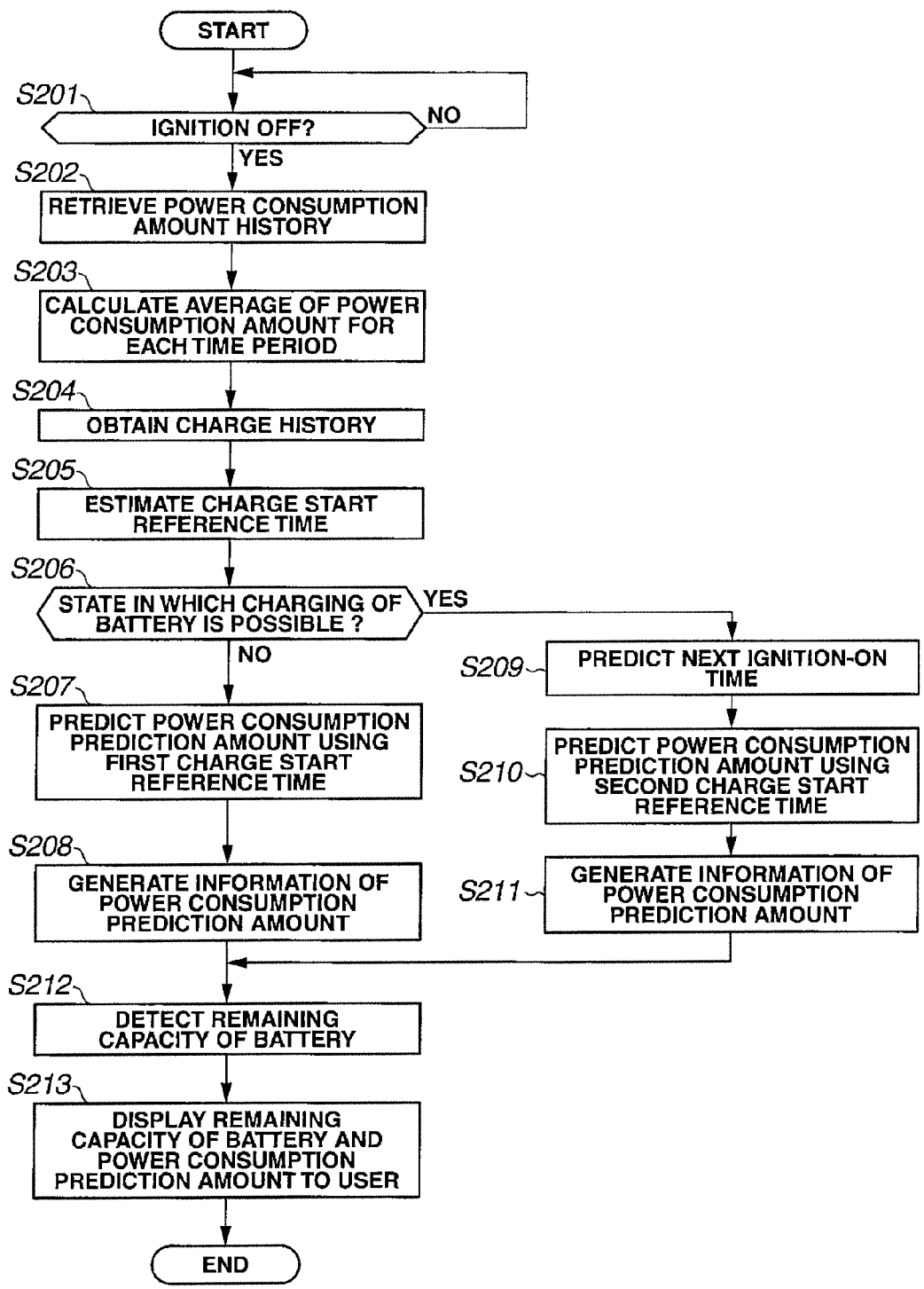
FIG. 8 is a flow chart showing an information providing process of the present embodiment.

Next, the information providing process that provides or shows the information of the remaining capacity of the battery 1 and the power consumption prediction amount to the user will be explained. FIG. 8 is a flow chart showing the information providing process of the present embodiment. The information providing process of the present embodiment will be explained below with reference to FIG. 8.

First, at step S201, on the basis of the ignition obtained by the obtaining function of the control device 130, a judgment is made as to whether or not the ignition is turned off by the charge necessity judgment information generating function of the control device 130. If it is judged that the ignition is turned off, the routine proceeds to step S202. If the ignition-on is judged, the routine waits at step S201.

Figure 9:
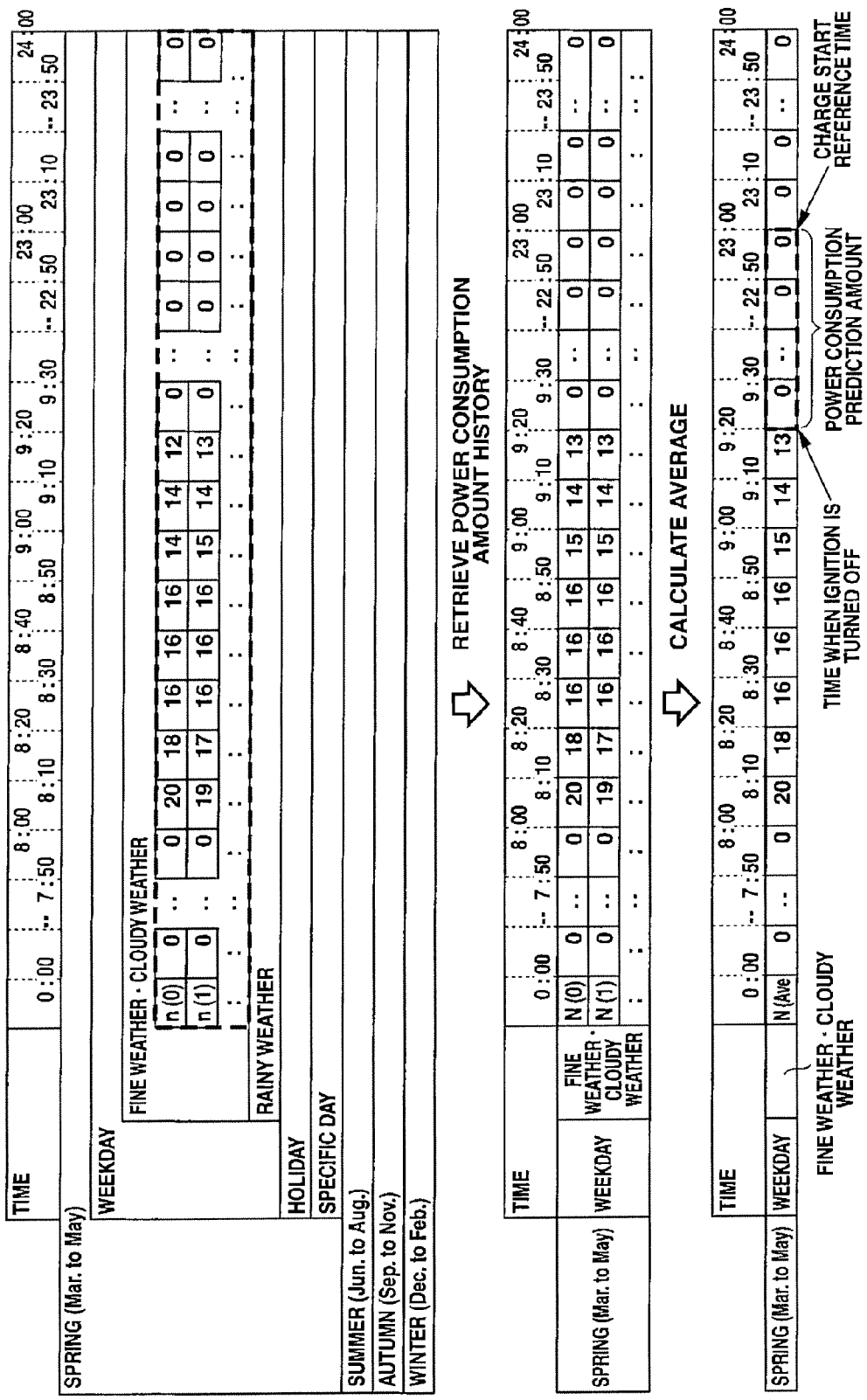
FIG. 9 is a drawing for explaining a generating manner of the information of the power consumption prediction amount.

At step S202, the power consumption amount history corresponding to the information of the attribute of the day, the season and the weather of the present time is retrieved from the history database 140 by the charge necessity judgment information generating function. FIG. 9 is a drawing for explaining a generating manner of the information of the power consumption prediction amount. For instance, in the example shown in FIG. 9, in a case where the attribute of the day, the season and the weather of the present time are the weekday, the spring (March to May) and the fine weather•the cloudy weather respectively, a power consumption amount history classified as "the attribute of the day is the weekday, the season is the spring (March to May), and the weather is the fine weather•the cloudy weather" is retrieved from the power consumption amount history stored in the history database 140.

Next, at step S203, on the basis of the power consumption amount history retrieved at step S202, an average of the power consumption amount for each time period is calculated by the charge necessity judgment information generating function. For example, in the example shown in FIG. 9, using the power consumption amount history retrieved at step S202, the average of the power consumption amount for each 10 minute time period from 0:00 to 24:00 is calculated. That is, in the example shown in FIG. 9, an average of the power consumption amount for the time period from 8:00 to 8:10 is calculated as 20 (kWh), and an average of the power consumption amount for the time period from 8:10 to 8:20 is calculated as 18 (kWh). Likewise, averages of the power consumption amount for each 10 minute time period from 0:00 to 8:00 and from 8:20 to 24:00 are calculated.

At step S204, the charge history stored in the history database 140 is obtained by the estimating function. Then, at step S205, on the basis of the charge history obtained at step S204, the charge start reference time which is the time when the charging of the battery 1 starts by the user is estimated by the estimating function. For instance, as shown in FIG. 2 and FIG. 3, in the case of the time period from 23:00 to 6:00 which has the high frequency of such charging that the predetermined amount of the power or more is charged and also the battery is charged to the full charge, the time period from 23:00 to 6:00 is determined as the basic charge time period, and "23:00" which is the start time of the basic charge time period is estimated as the charge start reference time.

At step S206, a judgment is made as to whether or not the present state is a state in which the charging of the battery 1 is possible by the charge necessity judgment information generating function. For example, the charge necessity judgment information generating function judges whether the time when the ignition is turned off is later than a predetermined time. Then, if the time when the ignition is turned off is judged to be later than the predetermined time, the charge necessity judgment information generating function judges that the user returns home and the present state is the state in which the battery 1 can be charged at user's home. If the charge necessity judgment information generating function judges that the present state is not the state in which the charging of the battery 1 is possible, the routine proceeds to step S207. If the charge necessity judgment information generating function judges that the present state is the state in which the charging of the battery 1 is possible, the routine proceeds to step S209.

At step S207, it has already been judged that the present state is not the state in which the charging of the battery 1 is possible. Then, on the basis of the average of the power consumption amount for each time period calculated at step S203 and the charge start reference time estimated at step S205, the power consumption amount which is the amount of the power consumed from the time when the ignition is turned off to the charge start reference time is predicted as the power consumption prediction amount by the charge necessity judgment information generating function.

More specifically, firstly, an immediate charge start reference time is determined as a first charge start reference time by the charge necessity judgment information generating function. Here, FIGS. 10A and 10B are drawings for explaining the charge start reference time used when predicting the power consumption prediction amount. FIG. 10A is the drawing for explaining the charge start reference time used in the case where it is judged that the present state is not the state in which the charging of the battery 1 is possible. In the case where it is judged that the present state is not the state in which the charging of the battery 1 is possible, as shown in FIG. 10A, the power consumption amount which is an amount of the power consumed from the time when the ignition is turned off to the first charge start reference time is predicted as the power consumption prediction amount by the charge necessity judgment information generating function. For instance, in the example shown in FIG. 10A, in a case where the ignition is turned off at 9:20, "23:00" on the same day as this ignition-off, which is the immediate charge start reference time, is determined as the first charge start reference time, from among the times of "23:00" estimated as the charge start reference time at step S205 (as shown in FIG. 10A, there are a plurality of charge start reference times such as "23:00" on the same day as this ignition-off and "23:00" on the next day).

Secondly, a total of the averages of the power consumption amount for each time period from the time when the ignition is turned off to the first charge start reference time, from among the averages of the power consumption amount for each time period calculated at step S203, is predicted as the power consumption prediction amount by the charge necessity judgment information generating function. For instance, in the example shown in FIG. 10A, the ignition is turned off at 9:20, and the total of the averages of the power consumption amount for each time period from the ignition-off time "9:20" on the same day to the first charge start reference time "23:00" on the same day as this ignition-off is predicted as the power consumption prediction amount.

Then, at step S208, the information of the power consumption prediction amount predicted at step S207 is generated as the information for the user's judgment on necessity of the charging the battery 1 (the user's judgment about whether or not the charging of the battery 1 is necessary). The generated information of the power consumption prediction amount is sent to the display 150.

On the other hand, if the charge necessity judgment information generating function judges that the present state is the state in which the charging of the battery 1 is possible at step S206, the routine proceeds to step S209. At step S209, by the predicting function of the control device 130, the time when next the ignition is turned on by the user is predicted as the next ignition-on time. Although the predicting manner of the next ignition-on time by the predicting function is not especially limited, for instance, the ignition obtained by the obtaining function of the control device 130 is stored as an ignition history with the ignition correlated with the time series, and on the basis of this ignition history, a time at which a frequency of the ignition-on is high could be predicted as the next ignition-on time.

Then, at step S210, on the basis of the next ignition-on time, the power consumption prediction amount is predicted by the charge necessity judgment information generating function. More specifically, by the charge necessity judgment information generating function, a next charge start reference time after the next ignition-on time predicted at step S209 is determined as a second charge start reference time.

FIG. 10B is the drawing for explaining the charge start reference time used in the case where it is judged that the present state is the state in which the charging of the battery 1 is possible. In the example shown in FIG. 10B, the ignition is turned off at 21:20, and the next ignition-on time is predicted as 8:00 on the next day. In the case where it is judged that the present state is the state in which the charging of the battery 1 is possible, as shown in FIG. 10B, the next charge start reference time "23:00" on the next day after the next ignition-on time "8:00" on the next day is determined as the second charge start reference time by the charge necessity judgment information generating function. Then, the power consumption amount which is an amount of the power consumed from the time when the ignition is turned off to the second charge start reference time is predicted as the power consumption prediction amount by the charge necessity judgment information generating function. In the example shown in FIG. 10B, by the charge necessity judgment information generating function, the power consumption amount which is an amount of the power consumed from the ignition-off time "21:20" on the same day to the second charge start reference time "23:00" on the next day is predicted as the power consumption prediction amount by the charge necessity judgment information generating function.

At subsequent step S211, the information of the power consumption prediction amount predicted at step S210 is generated as the information for the user's judgment on necessity of the charging the battery 1 (the user's judgment about whether or not the charging of the battery 1 is necessary). The generated information of the power consumption prediction amount is sent to the display 150.

At step S212, the remaining capacity of the battery 1 is detected by the remaining amount detection device 110. The detected remaining capacity of the battery 1 is sent to the display 150.

Then, at step S213, by the display 150, the information of the remaining capacity of the battery 1 detected at step S212 and the information of the power consumption prediction amount generated at step S208 and step S211 are displayed on the screen provided in the display 150, for example, as shown in FIG. 5 and FIG. 6, thereby providing or showing these information to the user. Further, at step S213, by the speaker 160, the informing tone or the vocal sound to inform the user of the display of the information of the remaining capacity of the battery 1 and the information of the power consumption prediction amount is outputted at the same time as the display of the information of the remaining capacity of the battery 1 and the information of the power consumption prediction amount by the display 150.

As explained above, the information providing apparatus of the present embodiment generates the power consumption amount history on the basis of the power consumption amount per the predetermined time. Then, on the basis of this power consumption amount history, the information providing apparatus predicts the power consumption amount which is the amount of the power consumed from the time when the ignition is turned off to the time when the charging of the battery 1 starts by the user, as the power consumption prediction amount for the user's judgment on necessity of the charging the battery 1 (the user's judgment about whether or not the charging of the battery 1 is necessary). The information of the predicted power consumption prediction amount is provided to the user together with the information of the remaining capacity of the battery 1. Hence, according to the present embodiment, the user can compare the information of the remaining capacity of the battery 1 and the information of the power consumption prediction amount, and the user can properly judge whether or not the charging of the battery 1 is necessary.

For instance, by providing or showing the information of the remaining capacity of the battery 1 and the information of the power consumption prediction amount to the user as shown in FIG. 5 and FIG. 6, since the user can compare the remaining capacity of the battery 1 and the power consumption prediction amount, the user can properly judge the necessity of the charging the battery 1. For example, as shown in FIG. 5, in the case where the remaining capacity of the battery 1 is displayed with its amount (the remaining capacity) being less (smaller) than the power consumption prediction amount, the user can judge that the charging of the battery 1 is necessary. On the other hand, as shown in FIG. 6, in the case where the remaining capacity of the battery 1 is displayed with its amount (the remaining capacity) being greater than the power consumption prediction amount, the user can judge that there is no need to hurry to charge the battery 1.

Further, according to the information providing apparatus of the present embodiment, when generating the power consumption amount history, the information of the power consumption amount is stored with the information of the power consumption amount correlated with the information of at least one of the attribute of the day when the power consumption amount is calculated, the season and the weather of the day. Here, the attribute of the day is, for example, the date and the day (Sun. to Sat.) when the power consumption amount is calculated and the information about whether the day when the power consumption amount is calculated is the weekday, the holiday or the specific day. Since these information has the influence on the presence or absence of the traffic jam, the frequency of operation of the battery 1 and the continuous operation time of the battery 1, etc., the power consumption amount is different according to the difference of the attribute of the day. Further, the weather is, for example, the information about whether the weather of the time when the power consumption amount is calculated is the fine weather, the cloudy weather or the rainy weather. Since the weather has the influence on the operation of the wiper and the defroster, the power consumption amount is different according to the difference of the weather. Furthermore, the season is the information about whether the season of the day when the power consumption amount is calculated is the spring, the summer, the autumn or the winter. Since the season has the influence on the air conditioner, the air resistance and the resistance of oil of the gear and the bearing etc., the power consumption amount is different according to the difference of the season.

For these reasons, in the present embodiment, by predicting the power consumption prediction amount using the power consumption amount history according to the attribute of the day, the season and the weather of the present time, it is possible to properly generate the information of the power consumption prediction amount. As a consequence, the user can properly judge whether or not the charging of the battery 1 is necessary.

Furthermore, according to the information providing apparatus of the present embodiment, when predicting the power consumption prediction amount, on the basis of the power consumption amount history, the average of the power consumption amount for each time period is calculated. Then, the total of the averages of the power consumption amount for each time period from the time when the ignition is turned off to the charge start reference time, from among the averages of the power consumption amount for each time period, is predicted as the power consumption prediction amount. Hence, according to the information providing apparatus of the present embodiment, since the power consumption prediction amount can be properly predicted using the average of the power consumption amount for each time period, it is possible to generate the information of the power consumption prediction amount more properly. Consequently, the user can properly judge whether or not the charging of the battery 1 is necessary.

In addition, according to the information providing apparatus of the present embodiment, as shown in FIG. 5 and FIG. 6, the information providing apparatus provides or shows, as the information of the power consumption prediction amount, the information of the vehicle-travelling power consumption prediction amount and the information of the vehicle-not-travelling power consumption prediction amount to the user so that the user can recognize these information. Hence, according to the information providing apparatus of the present embodiment, since the user can properly grasp the vehicle-travelling power consumption prediction amount and the vehicle-not-travelling power consumption prediction amount from the predicted power consumption prediction amount, the user can properly judge whether or not the charging of the battery 1 is necessary.

According to the information providing apparatus of the present embodiment, when it is judged that the present state is the state in which the charging of the battery 1 is possible (YES at step S206), the time when next the ignition is turned on by the user is predicted as the next ignition-on time, and the next charge start reference time after the next ignition-on time is determined as the second charge start reference time. Then, the power consumption amount which is the amount of the power consumed from the time when the ignition is turned off to the second charge start reference time is predicted as the power consumption prediction amount. In this way, when predicting the power consumption prediction amount, by using the next charge start reference time after the time when next the ignition is turned on by the user in the state in which the charging of the battery 1 is possible, it is possible to properly predict the power consumption amount which is the amount of the power consumed until the next charging of the battery 1 by the user. The user can therefore properly judge whether or not the charging of the battery 1 is necessary.

Second Embodiment

Figure 11:
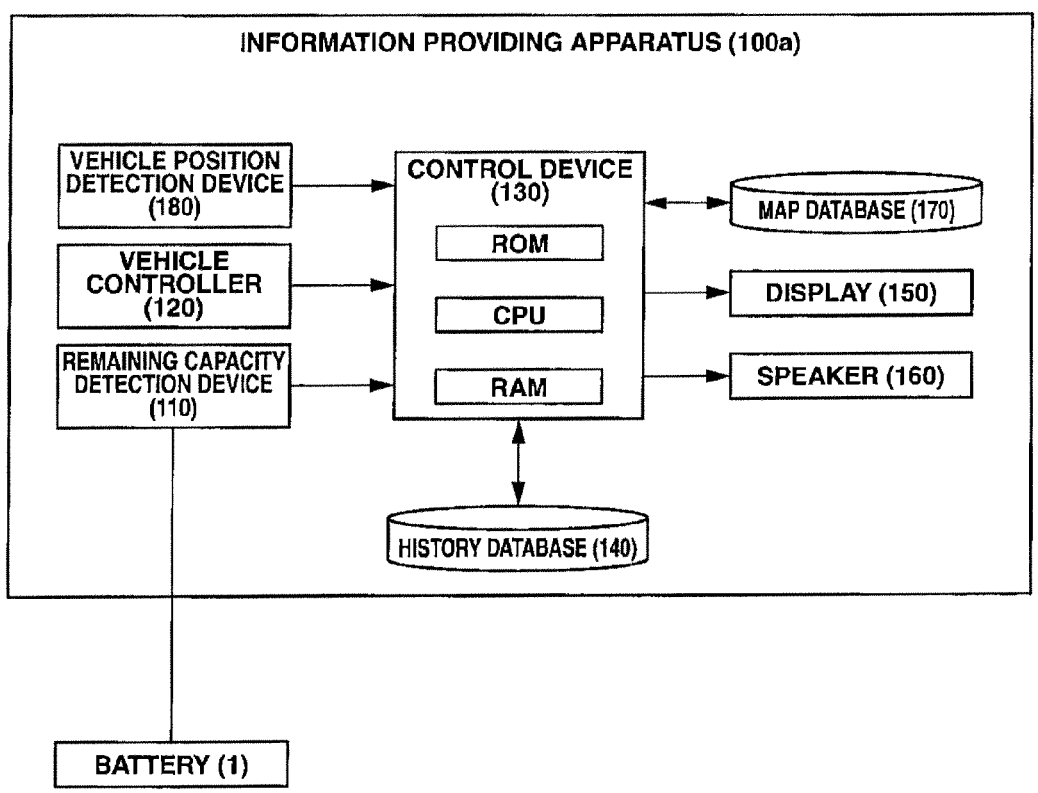
FIG. 11 is a block diagram of an information providing apparatus of a second embodiment.

Next, an information providing apparatus of a second embodiment will be explained with reference to FIG. 11. FIG. 11 is a block diagram of an information providing apparatus 100*a* of the second embodiment. The information providing apparatus 100*a* of the second embodiment has the same configuration as that of the information providing apparatus 100 of the first embodiment, and performs the same operation as that of the information providing apparatus 100 of the first embodiment, except some points explained below.

As shown in FIG. 11, the information providing apparatus 100*a* in the second embodiment has the remaining amount detection device 110, the vehicle controller 120, the control device 130, the history database 140, the display 150 and the speaker 160, and further has a map database 170 and a vehicle (host vehicle) position detection device 180.

The map database 170 stores therein a map data, also stores POI (Point Of Interest) information such as name, location (position or point) and type of various facilities and registration-point information that is registered by the user.

The vehicle position detection device 180 is formed by a GPS unit, a gyro-sensor, a vehicle speed sensor, etc. The vehicle position detection device 180 detects radio waves transmitted from a plurality of communication satellites and periodically obtains position information of the vehicle, and detects a present position of the vehicle on the basis of the vehicle position information obtained, angle-change information obtained from the gyro-sensor and a vehicle speed obtained from the vehicle speed sensor.

Further, in the present embodiment, the vehicle position detection device 180 judges whether or not the vehicle is positioned (or stops) at, for instance, the registration-point such as the user's home and the office and the facility such as a supermarket and a charging station, on the basis of the vehicle position information, the POI information and the registration-point information stored in the map database 170. Then, if the vehicle is positioned at these registration-point and facility, the vehicle position detection device 180 detects, as information of the facility at which the vehicle is positioned, these registration-point information and POI information of the facility. The vehicle position information and the information of the facility at which the vehicle is positioned, detected by the vehicle position detection device 180, are sent to the control device 130.

Next, an information providing process of the second embodiment will be explained. The information providing process of the second embodiment is executed in the same manner as the information providing process, shown in FIG. 8, of the first embodiment, except that the judgment is made as to whether or not the present state is the state in which the charging of the battery 1 is possible using the vehicle position information and the information of the facility at which the vehicle is positioned, detected by the vehicle position detection device 180, at step S206. Here, the power consumption amount history and the charge history used in the information providing process of the second embodiment are generated in the same manner as the first embodiment. Its explanation is therefore omitted here.

In the information providing process of the second embodiment, step S201~step S205 are executed in the same manner as the information providing process of the first embodiment. That is, in the case of the ignition-off (YES at step S201), the power consumption amount history according to the attribute of the day, the season and the weather of the present time is retrieved (at step S202), and on the basis of the power consumption amount history, the average of the power consumption amount for each time period is calculated (at step S203). Then, the charge history is obtained (at step S204), and on the basis of the charge history, the charge start reference time is estimated (at step S205).

At step S206, by the charge necessity judgment information generating function of the control device 130, the judgment is made as to whether or not the present state is the state in which the charging of the battery 1 is possible. Here, in the second embodiment, the charge necessity judgment information generating function obtains, from the vehicle position detection device 180, the vehicle position information and the information of the facility at which the vehicle is positioned, detected by the vehicle position detection device 180, and judges whether or not the present state is the state in which the charging of the battery 1 is possible on the basis of these vehicle position information and information of the facility at which the vehicle is positioned. For example, when it is judged, on the basis of the vehicle position information and the information of the facility at which the vehicle is positioned, that the vehicle is positioned at the user's home, the charge necessity judgment information generating function judges that the present state is the state in which the battery 1 can be charged by the user at the user's home. Then the routine proceeds to step S209, and the power consumption prediction amount is predicted using the second charge start reference time (at step S210).

Step S207~step S213 in the information providing process of the second embodiment are the same as those of the information providing process, shown in FIG. 8, of the first embodiment, and its explanation is omitted here.

As explained above, the information providing apparatus 100*a* of the second embodiment further has the map database 170 and the vehicle position detection device 180, and detects the vehicle position information by the vehicle position detection device 180, also detects the information of the facility at which the vehicle is positioned on the basis of the registration-point information and the POI information stored in the map database 170. Then, the information providing apparatus 100*a* judges whether or not the present state is the state in which the charging of the battery 1 is possible on the basis of the vehicle position information and the information of the facility at which the vehicle is positioned (at step S206). For example, when it is judged, on the basis of the vehicle position information and the information of the facility at which the vehicle is positioned, that the vehicle is positioned at the user's home, since it is possible to charge the battery 1 at the user's home, the information providing apparatus 100*a* judges that the present state is the state in which the battery 1 can be charged. Further, also when it is judged, on the basis of the vehicle position information and the information of the facility at which the vehicle is positioned, that the vehicle is positioned at the charging station, since it is possible to charge the battery 1 at the charging station, the information providing apparatus 100*a* judges that the present state is the state in which the battery 1 can be charged.

In this way, according to the second embodiment, since it is possible to properly judge whether or not the present state is the state in which the charging of the battery 1 is possible on the basis of the vehicle position information and the information of the facility at which the vehicle is positioned, the information of the power consumption prediction amount can be generated more properly. As a consequence, the user can properly judge whether or not the charging of the battery 1 is necessary.

Third Embodiment

Figure 12:
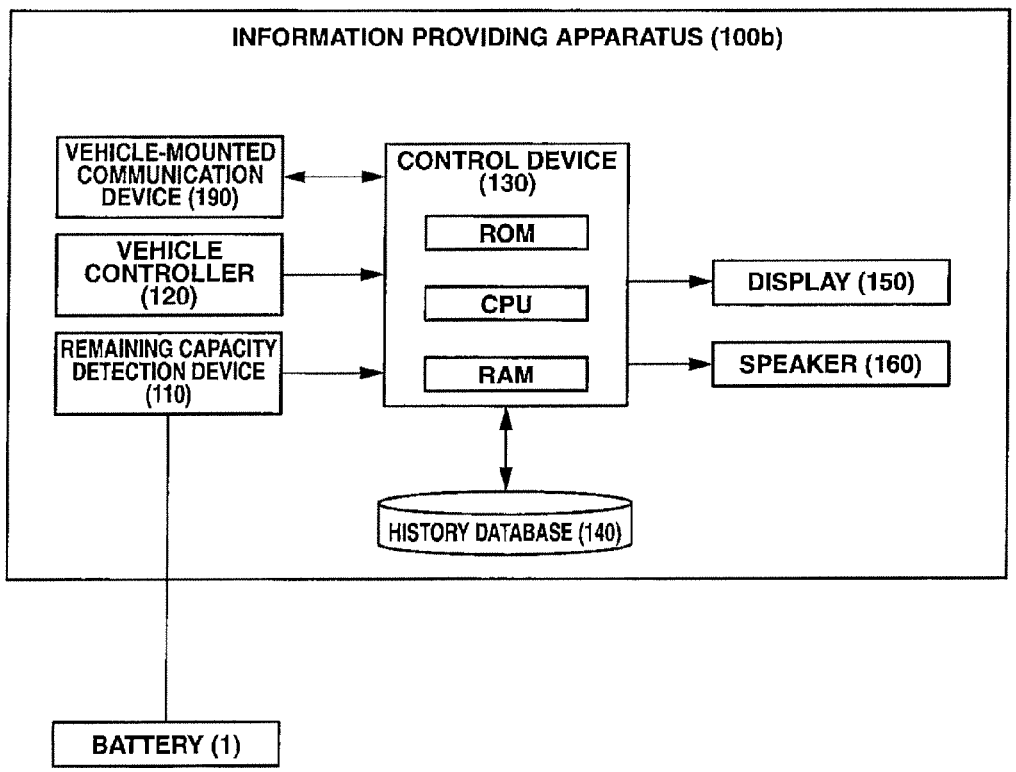
FIG. 12 is a block diagram of an information providing system of a third embodiment.

Next, an information providing system of a third embodiment will be explained with reference to FIG. 12. FIG. 12 is a block diagram of the information providing system of the third embodiment. As shown in FIG. 12, the information providing system of the third embodiment is formed by an information providing apparatus 100b and an information center 200 which are able to receive/send information from/to each other. The information providing apparatus 100b of the third embodiment has the same configuration as that of the information providing apparatus 100 of the first embodiment, and performs the same operation as that of the information providing apparatus 100 of the first embodiment, except some points explained below.

As shown in FIG. 12, the information providing apparatus 100b in the third embodiment has the remaining amount detection device 110, the vehicle controller 120, the control device 130, the history database 140, the display 150 and the speaker 160, and further has a vehicle-mounted communication device 190 for communication with the information center 200. The vehicle-mounted communication device 190 obtains the information of the power consumption amount and/or the power consumption amount history sent by the control device 130, and sends the information of the power consumption amount obtained and/or the power consumption amount history obtained to a center communication device 210. Further, the vehicle-mounted communication device 190 sends the average of the power consumption amount for each time period to the center communication device 210, to predict the power consumption prediction amount in an after-mentioned information providing process. Then, the vehicle-mounted communication device 190 receives statistical information based on this average of the power consumption amount for each time period from the center communication device 210, and sends it to the control device 130.

On the other hand, with respect to the information center 200, it is, for instance, a server provided outside the vehicle. The information center 200 has the center communication device 210, a center control device 220 and a center side database 230.

The center communication device 210 receives the information of the power consumption amount of each vehicle from the information providing apparatuses (including the information providing apparatus 100b) mounted in a plurality of the vehicles that use this information providing system, and sends the a plurality of received power consumption amount information to the center control device 220. Further, the center communication device 210 obtains statistical information calculated by the center control device 220, and sends it to the information providing apparatus 100b.

The center control device 220 has a ROM storing a program, a CPU, as an operation circuit, executing the program stored in this ROM and a RAM functioning as an accessible storage device. The center control device 220 generates the power consumption amount history based on the power consumption amounts of a plurality of the vehicles by storing the information of the power consumption amounts of a plurality of the vehicles sent from the center communication device 210 in the center side database 230 with these power consumption amount information correlated with the time when the power consumption amount is calculated. Further, when the average of the power consumption amount for each time period is sent from the information providing apparatus 100b, the center control device 220 corrects (or modifies) the average of the power consumption amount for each time period of each vehicle with consideration given to the power consumption amount history stored in the center side database 230, and sends it to the information providing apparatus 100b as the statistical information through the center communication device 210.

Next, an information providing process of the third embodiment will be explained. The information providing process of the third embodiment is executed in the same manner as the information providing process, shown in FIG. 8, of the first embodiment, except that when calculating the average of the power consumption amount for each time period at step S203, the average of the power consumption amount for each time period is corrected (or modified) with consideration given to the power consumption amounts of a plurality of the vehicles collected in the information center 200. Here, the power consumption amount history and the charge history used in the information providing process of the third embodiment are generated in the same manner as the first embodiment. Its explanation is therefore omitted here.

In the information providing process of the third embodiment, step S201 and step S202 are executed in the same manner as the information providing process of the first embodiment. That is, in the case of the ignition-off (YES at step S201), the power consumption amount history according to the attribute of the day, the season and the weather of the present time is retrieved (at step S202).

At step S203, by the charge necessity judgment information generating function, the average of the power consumption amount for each time period is calculated on the basis of the power consumption amount history retrieved at step S202. In the third embodiment, the average of the power consumption amount for each time period generated by the charge necessity judgment information generating function is sent to the information center 200 by the vehicle-mounted communication device 190. Then, the average of the power consumption amount for each time period generated by the charge necessity judgment information generating function is corrected (or modified) on the basis of the information of the power consumption amounts of a plurality of the vehicles by the center control device 220 in the information center 200, and the vehicle-mounted communication device 190 obtains it as the statistical information.

Further, when predicting the power consumption prediction amount at step S207 and step S210, the power consumption prediction amount is predicted on the basis of the statistical information obtained at step S203. Step S204~step S213 except the above steps are the same as those of the information providing process of the first embodiment, and its explanation is therefore omitted here.

As explained above, the information providing apparatus 100b of the third embodiment further has the vehicle-mounted communication device 190, and can receive/send data from/to the information center 200 provided outside the vehicle. In the third embodiment, when predicting the power consumption prediction amount, the average of the power consumption amount for each time period calculated in the information providing apparatus 100b is corrected (or modified) on the basis of the information of the power consumption amounts of a plurality of the vehicles collected by the information center 200, and is used as the statistical information for the prediction of the power consumption prediction amount.

In this way, in the third embodiment, the average of the power consumption amount for each time period calculated in the information providing apparatus 100b is corrected (or modified) with consideration given to the information of the power consumption amounts of a plurality of the vehicles collected by the information center 200, thereby predicting the power consumption prediction amount more properly. As a consequence, the user can properly judge whether or not the charging of the battery 1 is necessary.

The embodiments explained above are the ones that are described to easily understand the present invention, and the present invention is not limited to these embodiments. Therefore, each element or component disclosed in the above embodiments includes all elements or components undergone engineering-change and all equivalent elements or components which are included in the technical scope of the present invention.

That is, the present invention is not limited to the above embodiments, and could be achieved by combining the above first to third embodiments.

In the above embodiments, the power consumption amount is calculated for each time and is stored. However, it is not limited to this manner (this configuration). For instance, it could be possible to calculate and store the power consumption amount at a timing when a certain event such as operation of the wiper and setting-change of the air conditioner occurs.

Further, in the above embodiments, the power consumption amount history generating function of the control device 130 stores the power consumption amount calculated by calculating function in the history database 140 with the power consumption amount correlated with the time series. However, in a case where the power consumption amount calculated by calculating function is 0 (zero), such a manner that this power consumption amount is not stored in the history database 140 could be possible.

Furthermore, in the above embodiments, the power consumption amount history and the charge history are generated for each vehicle. However, the generation of the power consumption amount history and the charge history is not limited to this manner (this configuration). For example, the user is recognized or identified from a key-ID of the vehicle which the user has, then the power consumption amount history and the charge history could be generated for each determined user. With this configuration, the power consumption prediction amount according to each user is properly predicted, and the information of the power consumption prediction amount can be generated. As a consequence, the user can properly judge whether or not the charging of the battery is necessary.

In addition, in the above embodiments, as the display 150, for example, an excellent or a fine display having high graphics performance, such as the display of the navigation system, is used. However, the display is not limited to this display. For instance, a display of a remote control key, having a relatively low graphics performance, might be used.

Figure 13A:
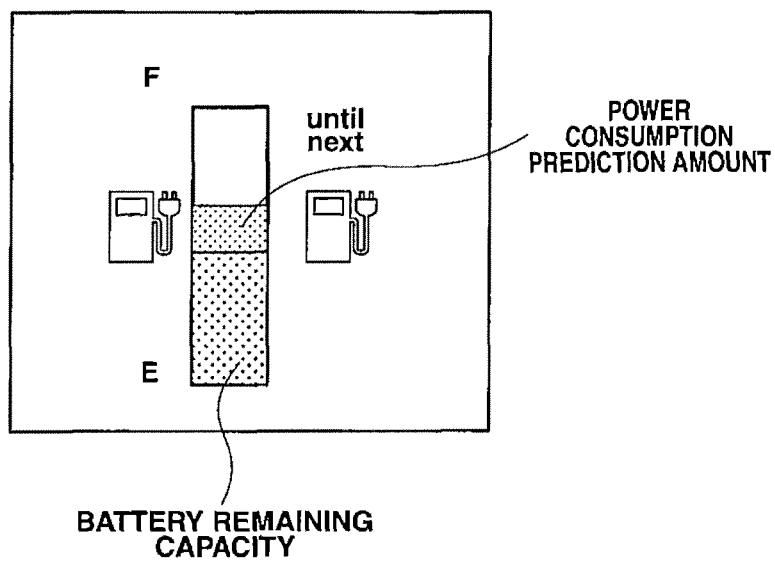
FIGS. 13A and 13B are drawings of another example showing the battery remaining capacity information (battery remaining amount information) and the power consumption prediction amount information, displayed on the display.
Figure 13B:
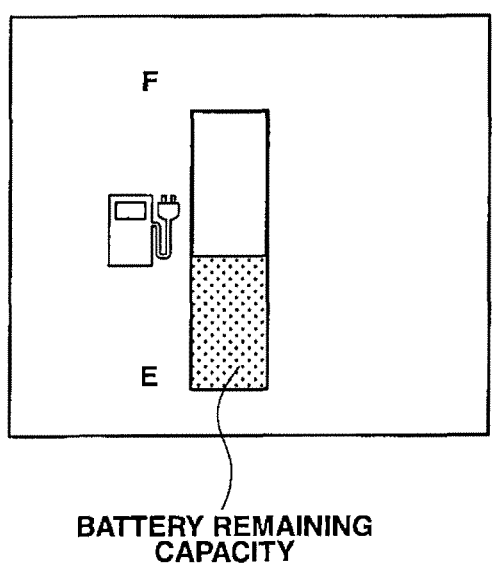

Here, FIGS. 13A and 13B are drawings of another example showing the battery remaining capacity information and the power consumption prediction amount information, displayed on the display 150. In the case where the display of the remote control key, having the relatively low graphics performance, is used, as shown in FIG. 13A, the battery remaining capacity information and the power consumption prediction amount information could be displayed with the information of the remaining capacity of the battery 1 superimposed on the power consumption prediction amount information. In this way, in the example shown in FIG. 13A, since the power consumption prediction amount is displayed with its amount (the power consumption prediction amount) being greater than the remaining capacity of the battery 1, the user can judge that the charging of the battery 1 is necessary.

Further, in the case where the power consumption prediction amount is greater than the remaining capacity of the battery 1 as described above, the display with the information of the remaining capacity of the battery 1 superimposed on the power consumption prediction amount information (the display on which these information overlaid) as shown in FIG. 13A, and a display on which only the information of the remaining capacity of the battery 1 is displayed as shown in FIG. 13B, are alternately displayed, then the power consumption prediction amount information could be displayed with the power consumption prediction amount blinking. In the case where the charging of the battery 1 is necessary, the blink of the power consumption prediction amount information can alert the user (can call user's attention).

Moreover, in the above embodiments, the informing tone or the vocal sound to inform the user of the display of the information of the remaining capacity of the battery 1 and the information of the power consumption prediction amount is outputted by the speaker 160 together with the display of these information by the display 150. However, in addition to this manner (this configuration), tone color or sound level (loudness) of the informing tone and the vocal sound or message of the voice guidance could be changed according to a difference between the remaining capacity of the battery 1 and the power consumption prediction amount. For example, in a case where the remaining capacity of the battery 1 is much greater than the power consumption prediction amount, light sound (soft tone) of the informing tone is outputted, while in a case where the remaining capacity of the battery 1 is less than the power consumption prediction amount, in order to call the user's attention, informing tone having strong appeal to the user could be outputted.

In the above embodiments, although the average of the power consumption amount for each time period is calculated at step S203, the calculation is not limited to the average. For instance, a maximum value, a minimum value or a σ-value of the power consumption amount for each time period could be calculated.

Additionally, in the above embodiments, when the ignition is turned off, the information of the remaining capacity of the battery 1 and the information of the power consumption prediction amount are provided or displayed to the user. However, in addition to, or instead of this manner (this configuration), for example, when the ignition is turned on, or during the ignition-on, the information of the remaining capacity of the battery 1 and the information of the power consumption prediction amount can be provided or displayed to the user.

Further, as the timing when the information of the remaining capacity of the battery 1 and the information of the power consumption prediction amount are provided or displayed to the user, a timing could be chosen at any given time by the user (e.g. by pressing a switch or pushing a button). In such cases, for instance, when the remaining capacity of the battery 1 is displayed with its amount (the remaining capacity) being less than the power consumption prediction amount, the information providing apparatus can motivate the user to properly judge the necessity of charging the battery 1, for example, the user judges that there is a need to search for the charging station to charge the battery 1.

Further, in the above embodiments, at step S209 and step S210, the time when next the ignition is turned on is predicted as the next ignition-on time, and the power consumption amount which is the amount of the power consumed from the time when the ignition is turned off to the next charge start reference time (the second charge start reference time) after the next ignition-on time is predicted as the power consumption prediction amount. However, the prediction of the power consumption prediction amount is not limited to this manner (this configuration). For instance, it could be possible to predict, as the power consumption prediction amount, the power consumption amount which is an amount of the power consumed until the next charge start reference time after the immediate charge start reference time. For instance, in the example shown in FIG. 10B, since the ignition is turned off at 21:20, the next charge start reference time "23:00" on the next day after the immediate charge start reference time "23:00" on the same day is determined as the second charge start reference time. Then, the power consumption amount which is the amount of the power consumed from the ignition-off time "21:20" on the same day to the second charge start reference time "23:00" is predicted as the power consumption prediction amount.

In the above embodiments, the remaining amount detection device 110 corresponds to a remaining amount (or a remaining capacity) detecting section or means of the present invention, the control device 130 corresponds to a power consumption amount detecting section or means, a power consumption amount history generating section or means, a charge necessity judgment information generating section or means, a charge status detecting section or means, a charge history generating section or means, an estimating section or means, a predicting section or means and a recognizing section or means, of the present invention, and the display 150 corresponds to a providing (or a displaying) section or means of the present invention.

The invention claimed is:

1. An information providing apparatus for vehicle comprising:
   a remaining capacity detecting section that detects a remaining capacity of a battery;
   a power consumption amount detecting section that detects a power consumption amount of the battery;
   a power consumption amount history generating section that generates a power consumption amount history on the basis of the power consumption amount detected by the power consumption amount detecting section;
   a charge necessity judgment information generating section that generates, on the basis of the power consumption amount history generated by the power consumption amount history generating section, power consumption prediction information which is information for judging whether charging of the battery is necessary;
   a providing section that provides, to a user, both information of the remaining capacity of the battery and the power consumption prediction information, the information of the remaining capacity of the battery and the power consumption prediction information being correlated with each other;
   a charge status detecting section that detects a charge status of the battery;
   a charge history generating section that generates a charge history on the basis of the charge status of the battery detected by the charge status detecting section; and
   an estimating section that estimates a time when charging of the battery starts by the user as a charge start reference time, on the basis of the charge history generated by the charge history generating section,
   wherein, in a case where an ignition is turned off, the charge necessity judgment information generating section predicts, as a power consumption prediction amount, a power consumption amount which is an amount of power consumed from a time when the ignition is turned off to the charge start reference time, and generates the power consumption prediction information on the basis of the predicted power consumption prediction amount.

2. The information providing apparatus for the vehicle as claimed in claim 1, wherein:
   the power consumption amount history generating section generates the power consumption amount history with information of the power consumption amount correlated with information of at least one of an attribute of a day when the power consumption amount is detected by the power consumption amount detecting section, season and weather of the day.

3. The information providing apparatus for the vehicle as claimed in claim 1, wherein:
   the charge necessity judgment information generating section calculates a statistic of the power consumption amount for a predetermined time period by performing a statistical processing of the power consumption amount history, and generates the power consumption prediction information on the basis of the calculated statistic.

4. The information providing apparatus for the vehicle as claimed in claim 3, wherein:
   the statistic is an average of the power consumption amount for the predetermined time period.

5. The information providing apparatus for the vehicle as claimed in claim 1, further comprising:
   a predicting section that predicts a time when the ignition is next turned on as a next ignition-on time, in the case where the ignition is turned off,
   wherein in the case where the ignition is turned off, the charge necessity judgment information generating section judges whether a present state is a state in which the battery is chargeable, and as a result of the judgment, when judging that the present state is the state in which the battery is chargeable, the charge necessity judgment information generating section predicts, as the power consumption prediction amount, a power consumption amount which is an amount of the power consumed from the time when the ignition is turned off to a next charge start reference time after the next ignition-on time.

6. The information providing apparatus for the vehicle as claimed in claim 1, wherein:
   the charge necessity judgment information generating section generates the power consumption prediction information in consideration of a vehicle-travelling power consumption prediction amount and a vehicle-not-travelling power consumption prediction amount, and
   the providing section provides the power consumption prediction information to permit recognition, by the user, of information of the vehicle-travelling power consumption prediction amount and information of the vehicle-not-travelling power consumption prediction amount.

7. The information providing apparatus for the vehicle as claimed in claim 1, further comprising:
   a recognizing section that recognizes the user, and
   wherein the power consumption amount history generating section generates the power consumption amount history for each user recognized by the recognizing section.

8. An information providing method for a vehicle comprising:
   generating a power consumption amount history on the basis of a power consumption amount of a battery;
   generating, on the basis of the power consumption amount history, power consumption prediction information which is information for judging whether charging of the battery is necessary;
   providing, to a user, both of information of a remaining capacity of the battery and the power consumption prediction information, with the information of the remaining capacity of the battery and the power consumption prediction information being correlated with each other;

detecting a charge status of the battery;

generating a charge history on the basis of the detected charge status of the battery;

estimating a time when charging of the battery starts by the user as a charge start reference time, on the basis of the generated charge history, and in a case where an ignition is turned off, predicting, as a power consumption prediction amount, a power consumption amount which is an amount of power consumed from a time when the ignition is turned off to the charge start reference time, and generating the power consumption prediction information on the basis of the predicted power consumption prediction amount.

* * * * *